T. G. PLANT.
BED LASTING MACHINE.
APPLICATION FILED DEC. 28, 1906. RENEWED NOV. 22, 1909.

958,291.

Patented May 17, 1910.
10 SHEETS—SHEET 4.

Witnesses:
Edwin T Luce
Adolph E Kaiser

Inventor:
Thomas G. Plant,
by Emery & Booth
Attys.

T. G. PLANT.
BED LASTING MACHINE.
APPLICATION FILED DEC. 28, 1906. RENEWED NOV. 22, 1909.

958,291.

Patented May 17, 1910.
10 SHEETS—SHEET 8.

Witnesses:

Inventor:
Thomas G. Plant,
by Emery Booth
Atty's

G. PLANT.
BED LASTING MACHINE.
APPLICATION FILED DEC. 28, 1906. RENEWED NOV. 22, 1909.

958,291.

Patented May 17, 1910.
10 SHEETS—SHEET 10.

Witnesses:
Edwin S. Luce
Adolph C. Kaiser

Inventor:
Thomas G. Plant,
by Emery Booth
Attys

UNITED STATES PATENT OFFICE.

THOMAS G. PLANT, OF BOSTON, MASSACHUSETTS.

BED-LASTING MACHINE.

REISSUED

958,291. Specification of Letters Patent. Patented May 17, 1910.

Application filed December 28, 1906, Serial No. 349,782. Renewed November 22, 1909. Serial No. 529,299.

*To all whom it may concern:*

Be it known that I, THOMAS G. PLANT, a citizen of the United States, and a resident of Boston, in the county of Suffolk and State of Massachusetts, have invented an Improvement in Bed-Lasting Machines, of which the following description, in connection with the accompanying drawings, is a specification, like characters on the drawings representing like parts.

This invention relates to machines for lasting boots and shoes; particularly to lasting machines that employ wipers for wiping in the toes and heels of shoes. Such machines are variously known in the art, e. g. wiper machines, also bed lasting machines. In the use of machines of this type it is common to wipe in the upper with its linings at the toe or heel and then to withdraw the wipers slightly, not far enough to lose their holding engagement with the inturned materials but sufficiently to leave a margin of the latter exposed within the active edges of the wipers to permit the same to be tacked or otherwise fastened in position. It has been found in practice that this partial withdrawal of the wipers tends also to withdraw the inturned materials leaving the latter more or less loosened or slackened at the time of fastening them in position, thus losing more or less of the shape previously obtained by drawing the materials tightly to the wood of the last where they should have been retained for the best results.

One of the objects of my present invention is to correct this difficulty, as well as in other respects to improve the construction and mode of operation of a lasting machine of the type referred to, that better and quicker results may be had.

The various features of my invention will be best understood from a description of one embodiment thereof, such, for instance, as illustrated in the accompanying drawings.

Referring to the drawings: Fig. 6 is a sectional detail to be referred to.

Figure 1:
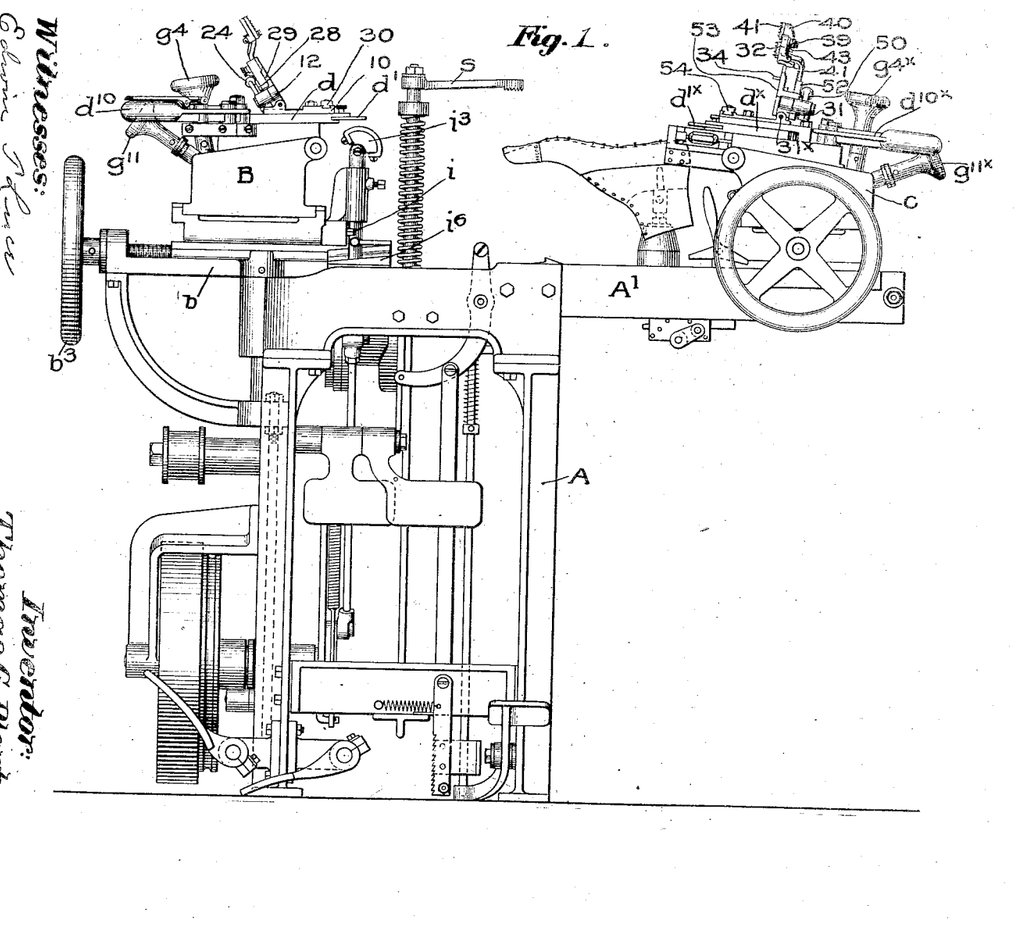
Figure 1 shows in side elevation, a typical lasting machine equipped with devices illustrating one embodiment of my invention.
Figure 2:
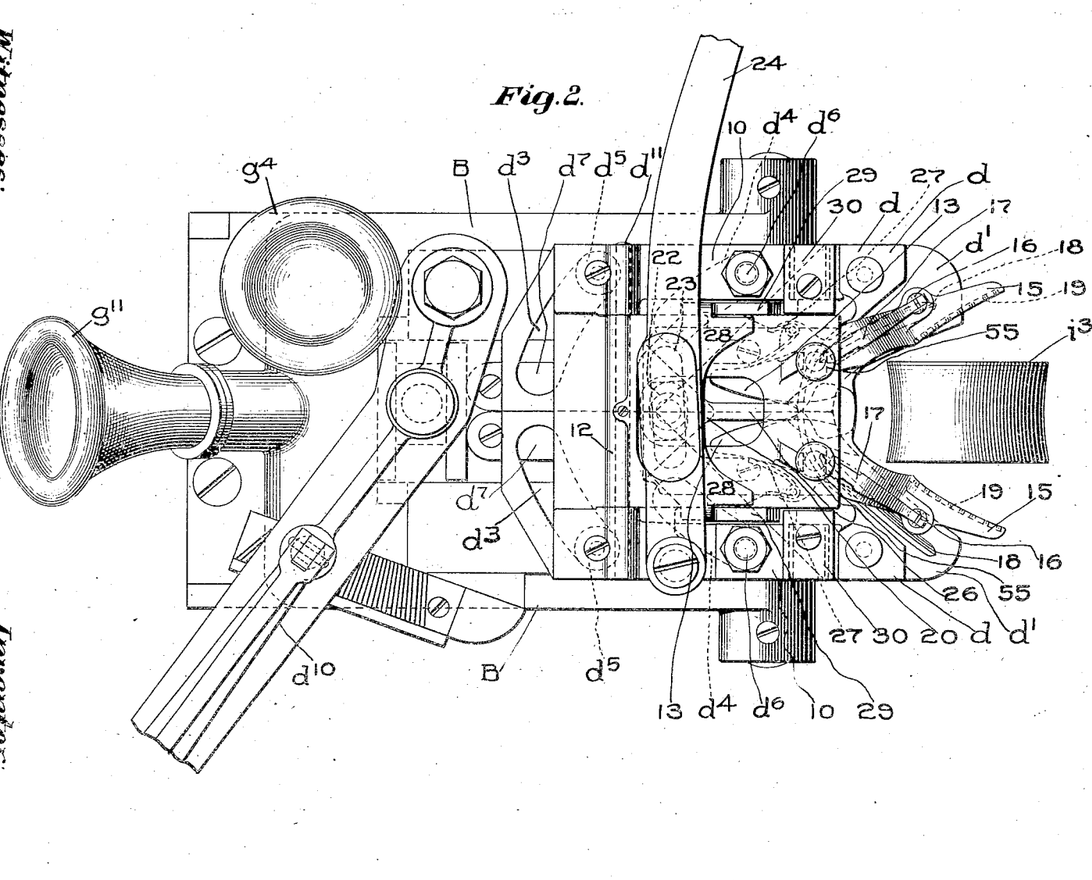
Fig. 2 is a plan view of the left hand or toe lasting head with the parts in position just prior to the use of the additional toe lasting means.

In the particular embodiment of my invention selected for illustration herein and shown in the drawings, referring first to Fig. 1, the machine illustrated merely typifies a type of machine to which my invention may be applied and in connection with which it may be used to advantage.

Other types of machine may be used without departing from the scope of my invention.

Figure 3:
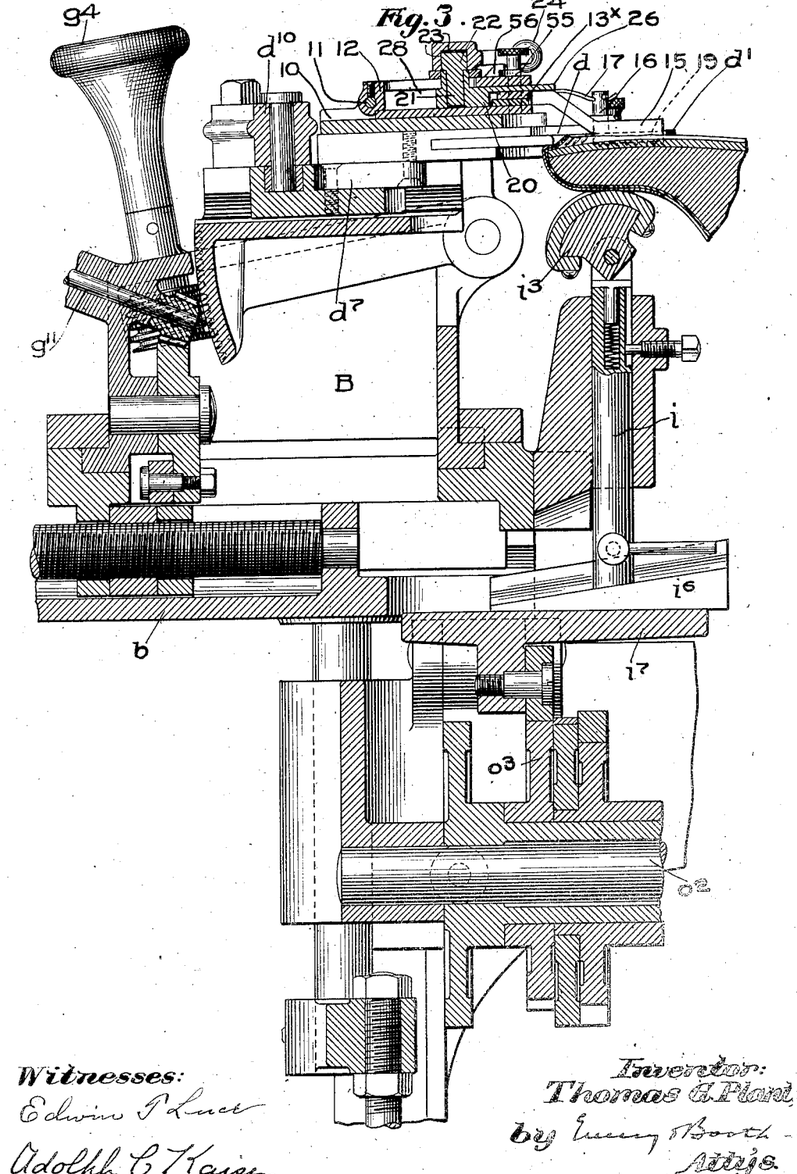
Fig. 3 is a vertical, longitudinal section of the toe head Fig. 2.

In the machine shown the frame A is provided at its upper left hand end with suitable slide-ways $b$, for the longitudinally adjustable toe lasting head B, movable from left to right, to accommodate shoes of different lengths, by adjusting devices controlled by the hand wheel $b^3$. The toe wipers are indicated at $d'$, removably secured in wiper carriers $d$, operated in usual manner by a wiper lever $d^{10}$, the wiper carriers being angularly adjustable longitudinally to accommodate the spring of the last by means controlled by the handle $g^4$, and angularly adjustable transversely to accommodate the roll of a last by means controlled by the handle $q^{11}$. The toe of the last (see Fig. 3) when positioned in the machine, rests upon a pad $i^2$, sustained by a vertically movable toe post $i$, adjustable by a wedge $i^5$ resting upon a table $i^7$, controlled by a cam $o^3$, on a shaft $o^2$, operated in suitable manner.

Referring again to Fig. 1, the frame A at its upper right hand end is provided with a longitudinally extended track A', upon which runs a carriage carrying the heel lasting head C. This head has mounted upon it heel wipers $d'^x$, removably held in suitable carriers $d^x$, the same being angularly adjustable longitudinally to accommodate the longitudinal pitch at the heel of the last by means controlled by a hand wheel $g^{4x}$, and angularly adjustable transversely to meet the roll of the heel end of the last by means controlled by a hand wheel $g^{11x}$.

The last is supported at its heel end (see Fig. 11) upon a heel pin $k$ sustained by a heel post $k^3$, adjustable from beneath by a roller $k^7$ running on a wedge $k^8$, controlled by a pinion $k^{26}$ operated in a suitable manner. The heel wipers are operated to cause them to close and open as desired by a manually controllable wiper lever $d^{10x}$ (see Fig. 1). The usual treadle operated hold down is indicated at $s$, its purpose being to hold the last firmly upon its supports after having been positioned thereon.

The parts above briefly referred to may be of any suitable or desired construction and operation and, either in the form shown or in other forms, will be entirely familiar to those skilled in the art. They require, therefore, no further detailed description herein, their general mode of operation being well-known and understood.

I will first describe various features of my invention that relate particularly to the toe lasting mechanism.

Referring to Figs. 2, and 7 to 9, the toe wipers $d'$, stated to be removably secured in the wiper carriers $d$, are mounted in any suitable or desired manner in the toe head, the said carriers being slotted at $d^3$, $d^4$, to receive suitable studs $d^5$, $d^6$, sustained in the toe head whereby longitudinal movement of said carriers with their wipers, to the right, as shown in the figures, will cause the wipers not only to advance but to close inward about and over the edge of a last in a well-known manner. This movement of the carriers and their wipers is produced herein by links $d^7$ jointed thereto and to a block moved by the lever $d^{10}$ referred to and fulcrumed at $d^y$ on the head. This lever preferably projects to the front, toward the operative, and may be provided with a handle end in convenient position to be engaged by the left hand of the operative, whereby said toe wipers may be caused to advance and retreat relative to and over the toe end of a last positioned in the machine. The above parts, or parts corresponding thereto, likewise need not differ substantially from machines well-known in the art.

Figure 4:
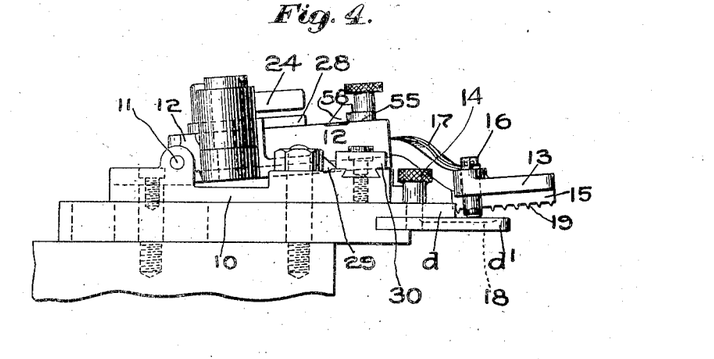
Fig. 4 is a detail in side elevation of a portion of the toe head with the parts in the position shown in Fig. 2.

Mounted upon the machine head, above the wiper carriers, and constituting one form of cap or holding means to retain said carriers in working position on the head, (see Fig. 7) are two side plates 10, 10, in which the upper ends of the studs $d^5$, $d^6$, may be held. These plates are provided with raised lugs to receive and hold the ends of a hinge rod 11 upon which and between said lugs is hinged the left hand end of a supplemental carrier 12. This supplemental carrier is more or less box shaped or hollow, to receive between its side walls (see Fig. 7) a pair of holding lasters 13, fulcrumed at 14 in the supplemental carrier. These lasters at their outer ends overlie the wipers $d'$ and have their inner edges downturned to form lips 15 (see Fig. 4), adapted to drop in front of or within the inner, active edges of the wipers. Normally the supplemental carrier, with its lasters 13, stands in an elevated, upturned position as shown in Fig. 1, and, when the lasters are to be brought into use, said supplemental carrier is turned down into position. To arrest the carrier and its lasters 13 when so turned down, I have provided said lasters at their outer ends (see Figs. 4 and 7) each with a vertically sliding stop pin 16, supported at its upper end by a spring 17 carried by its laster. The upper faces of the wipers $d'$ are provided, at a suitable distance inward from their active edges and substantially parallel to the latter, with grooves 18, preferably V shaped, and adapted to receive the lower V shaped ends of said pins 16.

Since the wipers may be rights or lefts, that is, since they may present a pronounced swing to the right or to the left according to the particular shoe to be operated upon, and, since the lasters 13 if positioned for either right or left wipers would not necessarily conform to the wipers next to be used when turned down upon the latter, it is desirable to provide means, such as the spring supported pins 16, to contact with the surfaces of the wipers and thereby arrest and support the lasters 13 above the wipers and in position to prevent contact of the downturned lips 15 with the wipers when the lasters are turned down thereupon. These lips for the best results should be provided with teeth 19 (see Fig. 4) for better engagement with the materials to be acted upon, and said teeth would be blunted if permitted to contact with the metallic wipers $d'$.

After the lasters have been arrested in their downturned movement by the spring supported pins 16, the operative, seizing them between his fingers, shifts them to one or the other side until the V shaped ends of said pins 16 drop into the grooves 18 provided therefor in the wipers. This permits the lasters to drop low enough to cause their lips 15 to drop in front of the active edges of the wipers but not low enough to permit their toothed edges to contact with the material under the wipers.

Figure 5:
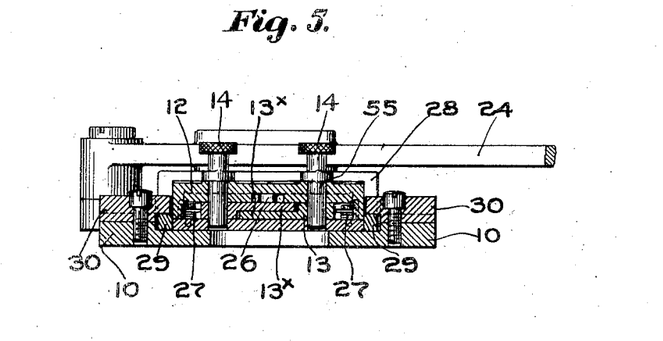
Fig. 5 is a transverse section of the upper portion of the toe lasting head on the dotted line 5—5, Fig. 8.

Referring again to Fig. 7, the inner, tail ends of the lasters 13 are provided with overlapping ears 13$^x$ to preserve their level and parallelism. Said inner or tail ends of the lasters 13 are made flaring, as shown, to receive between them a wedge or closer 20, provided with a stud 21 that rises through an opening in the top of the box shaped supplemental carrier 12 and carries at its upper end a loose block 22 that plays in a longitudinal slot 23 in a manually controllable lever 24, fulcrumed at 25 on the supplemental carrier 12. This lever 24, which I shall call the "laster lever" or "laster handle", preferably extends to that side of the head which is opposite the side to which the wiper actuating lever $d^{10}$ extends. This lever furnishes means for moving the said wedge 20 longitudinally or to the right, Fig. 7, to cause it to spread the tail ends of the lasters, to cause their outer or active ends to close inward over and upon the last or the materials thereon. The said wedge is provided with a nose piece 26 that plays freely in a groove provided therefor in the under side of the top of the box shaped supplemental carrier, as best shown in Fig. 5. The tails of the lasters 13 are maintained in effective contact with the wedge piece 20 by springs 27 (see Fig. 7).

Figure 6:
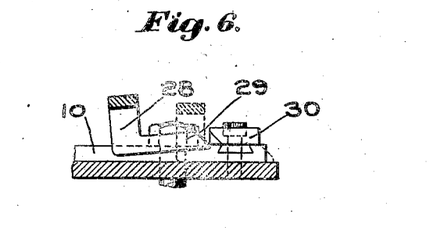

Overlying the supplemental carrier 12 (see Fig. 2) is a yoke 28 (shown best in Fig. 8) the same embracing the stud 21 that connects the laster handle with the wedge 20, said yoke piece having its ends downturned at the outer sides of said supplemental carrier (see Fig. 6) and extended longitudinally to form a pair of inclined or bevel ended fingers 29 adapted to play longitudinally in the toe head and at the sides of said supplemental carrier and relative thereto. These bevel ended fingers 29 are adapted to be projected forward by the handle 24 to cause them to pass under the oppositely beveled ears 30 secured upon the machine head, thereby to depress said fingers, their yoke and the toe lasters to cause the point 19 of the lasters to be pressed into or upon the material directly in front of the wipers.

Heretofore there have been two general types of bed lasting machines in use, in one of which the plates have merely an opening and closing movement, while in the other the head, carrying the plates, has also a rising and falling movement. In the former type a pad has usually been relied upon to close about and upon the end of the last, to shape the materials thereto preparatory to their being broken down or infolded upon the insole. In the latter type it has been customary, by closing the wipers against the end of the last, to utilize the lifting movement of the head through the wipers, to smooth the materials upward about the end of the last before infolding them by the same wipers upon the insole. My invention is applicable to either type of machine, but in the present instance I have shown, by way of illustration, a machine wherein the toe head has a rising and falling movement.

The preferred operation of the mechanism shown is as follows, namely; the shoe having been jacked in position with its toe upon the toe post shown, and the supplemental carrier with its lasters turned into their elevated or inoperative positions, the operative by means of the handle $d^{10}$ closes the wipers $d'$ more or less and simultaneously therewith raises the head to cause the wipers to close against the materials at the end of the last, to wipe the latter upward to the level of the insole upon the upturned bottom of the last.

If he desires, the operative may now close the wipers in the usual manner, by a further movement of the handle $d^{10}$, to break down the materials and infold them upon the margin of the insole upon the last, before bringing the laster 13 into operation, and he may do this a plurality of times if the nature of the work and materials require. In many instances, however, the materials to be lasted resist the infolding action of the wipers to such an extent that it is difficult to draw the materials "to the wood" and give thereto the desired shape of the last. In other words, the frictional engagement between the wipers and the materials is not sufficient to draw the latter "to the wood." My invention furnishes means for correcting this difficulty, and with the mechanism shown, in the following manner:

After having brought the wipers to the level of the insole or, where there is no lift of the wipers, after having brought the latter up to the work, the lasters 13 may be turned down into position and then, as the wipers are advanced over the edge of the insole by manipulation of the handle $d^{10}$, or prior thereto, the operative with his other hand draws forward the laster handle 24, causing by its initial movement the depression of the lasters 13 to cause their points to be jammed into or to enter the surface of the materials to be lasted, thereby obtaining thereon a positive bite or engagement that will not slip. Thereafter, the two handles are advanced substantially together the further advancement of the laster handle 24 acting to advance the wedge 20 (Fig. 7) to cause the active ends of the lasters 13 with their engaging points 19 positively to close over the insole and thereby through their said points 19 positively to draw the materials inward over and about the end of the last and obtaining a degree of stretch or conformation to the last that would be impossible by frictional means alone. When acting in this manner the said lasters may supplement the frictional action of the wipers behind them, or, they may be used to the exclusion of frictional means. After having been thus advanced, to draw the materials inward they may be retained by holding the laster handle 24 in position until the wipers have been positioned to clamp the materials near the edge of the last but sufficiently back from the edges thereof to permit of fastening the same, after which said lasters 13 may be released and turned upward to permit of tacking the exposed edges of the materials in position close to the edges of the wipers. Thus my invention as embodied in the mechanism shown provides means for effectively preventing any slackening of the stock by the backing off or partial withdrawal of the wipers preparatory to tacking and therefore preserves the best shape that it is possible to give to the materials by lasting devices; it also furnishes means other than the usual wipers for positively drawing the upper upward and about the end of the last where the materials would resist the action of usual lasting means to such an extent as to prohibit proper lasting or to prolong the lasting operation unduly. For example, the usual wipers employed in lasting a toe are so constructed and operated and also are almost always so adjusted by the operative as to take best hold of the materials at and about the immediate end of the last, and they have little or no hold on the materials at a point say one and one half to two inches down each side from the end of the toe, which makes it next to impossible to draw the upper down closely to the curve in the last just back of the thickest point of the top section of the toe. Because of this, the materials at such points down the sides of the last are brought in under such light tension or pull that, when the shoe has the sole attached and is placed under the pressure of the leveling machine, the materials at and in the vicinities of these points bulge outward and produce an uneven and irregular line at the side of the toe, thus losing the effect and desired contour of the last. By the use of end lasters, as described, the materials at the sides of the toe may be drawn inward as tightly as desired and to such extent as effectually to prevent the objectionable bulging referred to.

In other respects than here mentioned the lasting may proceed along well-known lines, it being unnecessary here to describe the many details that would suggest themselves to one skilled in the art.

Figure 7:
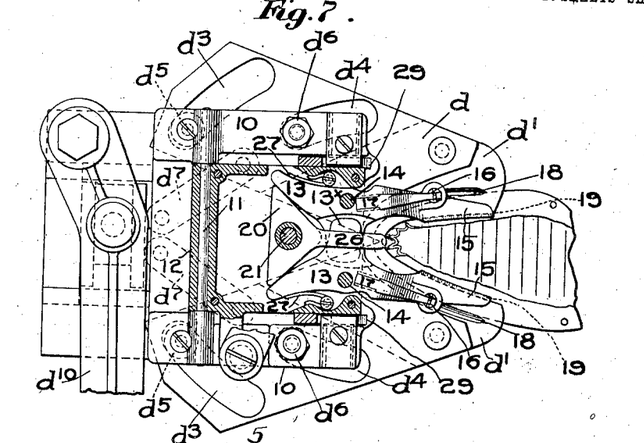
Figs. 7, 8 and 9 are diagrammatic views illustrating successive steps in the mode of operation of the mechanism illustrated in Figs. 1 to 6 inclusive.

Having raised the head and the wipers $d'$ to the level of the insole and closed the latter to infold the materials upon the insole, the operative may if he prefers now turn the supplemental carrier 12 downward, until supported upon the wipers $d'$ by the spring pins 16 and then adjust the lasters 13 so that said pins will drop into the grooves 18 thereby, as stated, dropping the lips 15 in front of the active edges of the wipers. He may then grasp with his other hand the laster handle 24 and bring said handle forward to produce corresponding forward movement of the yoke 28 causing the bevel ended fingers 29 of said yoke to pass under the ears 30 on the head which latter depress the said fingers and their yoke and thereby correspondingly depress the supplemental carrier 12 with its lasters 13 to cause the points 19 upon the leading ends of said lasters to be impinged upon or to enter the materials immediately in front of the active edges of the closed wipers, as shown in Fig. 7. In other words, this forward movement of the laster handle 24 causes the lasters 13 to be jammed down upon the materials immediately in front of the closed wipers to clamp the latter firmly in their infolded positions.

Figure 8:
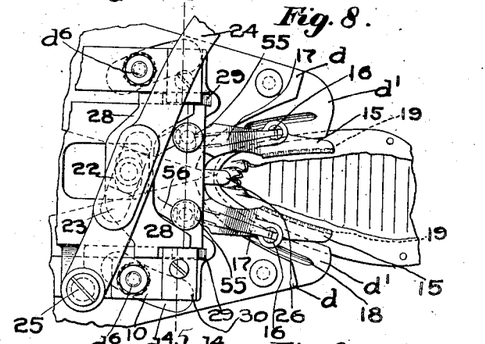

While now retaining his hold upon the laster handle 24 to retain it and the lasters in position, clamping the infolded materials upon the insole, the operative may retract the wiper handle $d^{10}$ sufficiently to withdraw the wiper toward the margin of the insole (as shown in Fig. 8) but not sufficiently to remove the wipers from holding contact with the infolded materials.

Figure 9:
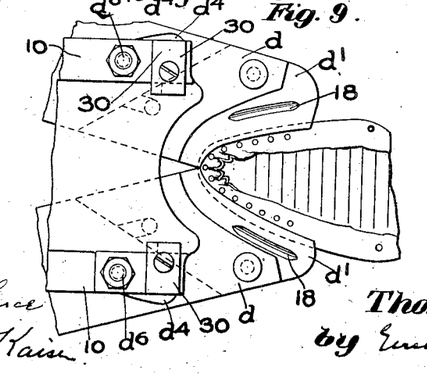

The operative may now return the laster handle 24 to its original position, withdrawing the fingers 29 from beneath the ears 30 thereby releasing the lasters, leaving them free to be turned upward into their original elevated positions, as shown in Fig. 1, leaving the exposed edges of the infolded materials within the wipers exposed and free to be fastened by tacks or otherwise, as shown in Fig. 9.

Taking up now the heel end of the machine, the wipers $d'^x$ are removably mounted, as stated, in wiper carrier $d^x$, provided as usual with slots $d^{3x}$, $d^{4x}$, which receive usual studs $d^{5x}$, $d^{6x}$, sustained in the heel lasting head and which cause the said carriers and their wipers to be closed and opened as they are advanced and retracted by means of the handle $d^{10x}$. Said handle is connected with said wiper carriers by usual links $d^{7x}$, as shown in Fig. 10, whereby the handle movements are communicated to the wiper carriers.

In the heel head, as with the toe head, the additional parts are mounted in a supplemental carrier, here marked 31, hinged at $31^x$ in the heel head. This supplemental carrier is substantially box shaped and receives between its side walls (see Fig. 12) two heel lasters 32. These heel lasters are not pivoted about fulcra fixed in the supplemental head as here shown with the toe mechanism, but are provided respectively with studs 33, 34, (see Fig. 12) which project upwardly from said lasters 32 and enter at their ends slots 35, 36, (see Fig. 10) provided therefor in the top wall of the box shaped supplemental carrier. These slots correspond in arrangement with the slots $d^{3x}$ and $d^{4x}$ so that if the heel wipers and the heel lasters 32 be simultaneously advanced to the left over the last they will be caused to close and open substantially correspondingly. The studs 34 are also prolonged at their lower ends (Fig. 13) to drop through the top plate of the heel head and to enter enlarged slots 351 in the wiper carriers. These slots 351 serve to enforce substantial register of the lasters 32 with the wipers beneath them before said lasters may drop into their full lowermost positions.

Figure 10:
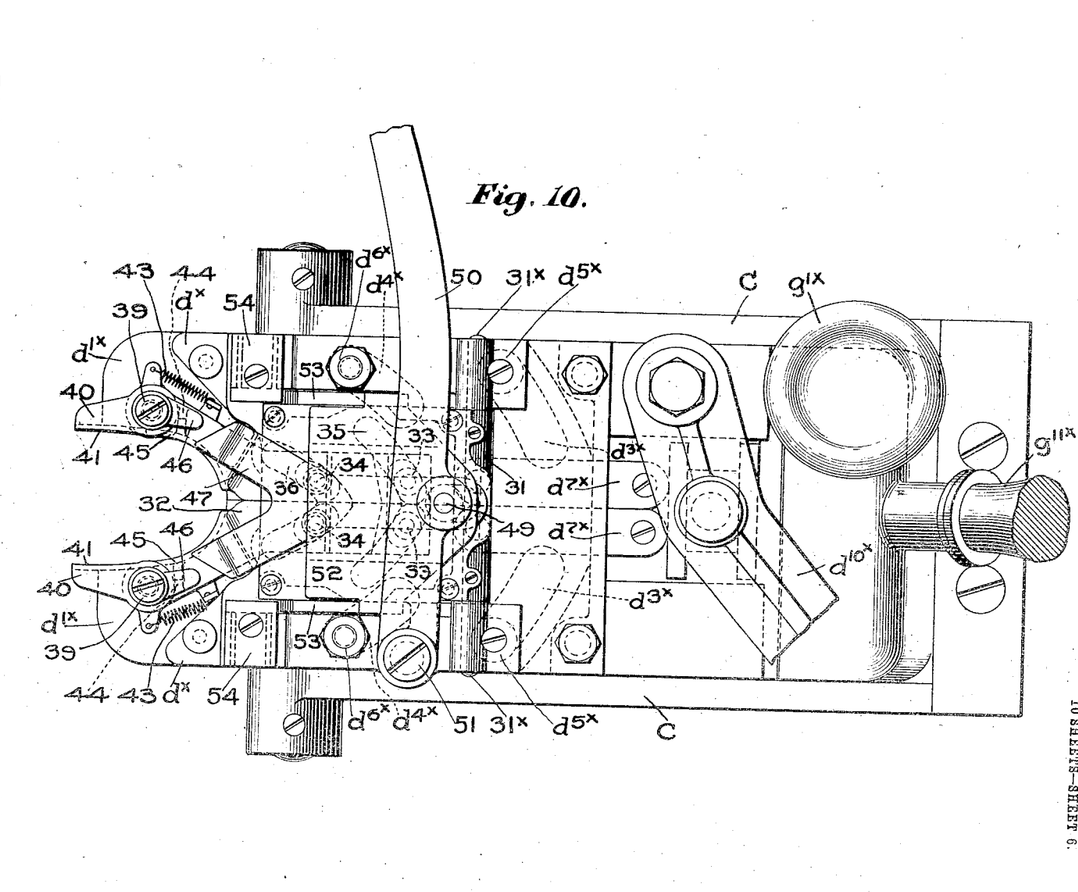
Fig. 10 is a plan view of the right hand or heel lasting head with the parts in position before lasting the heel.
Figure 11:
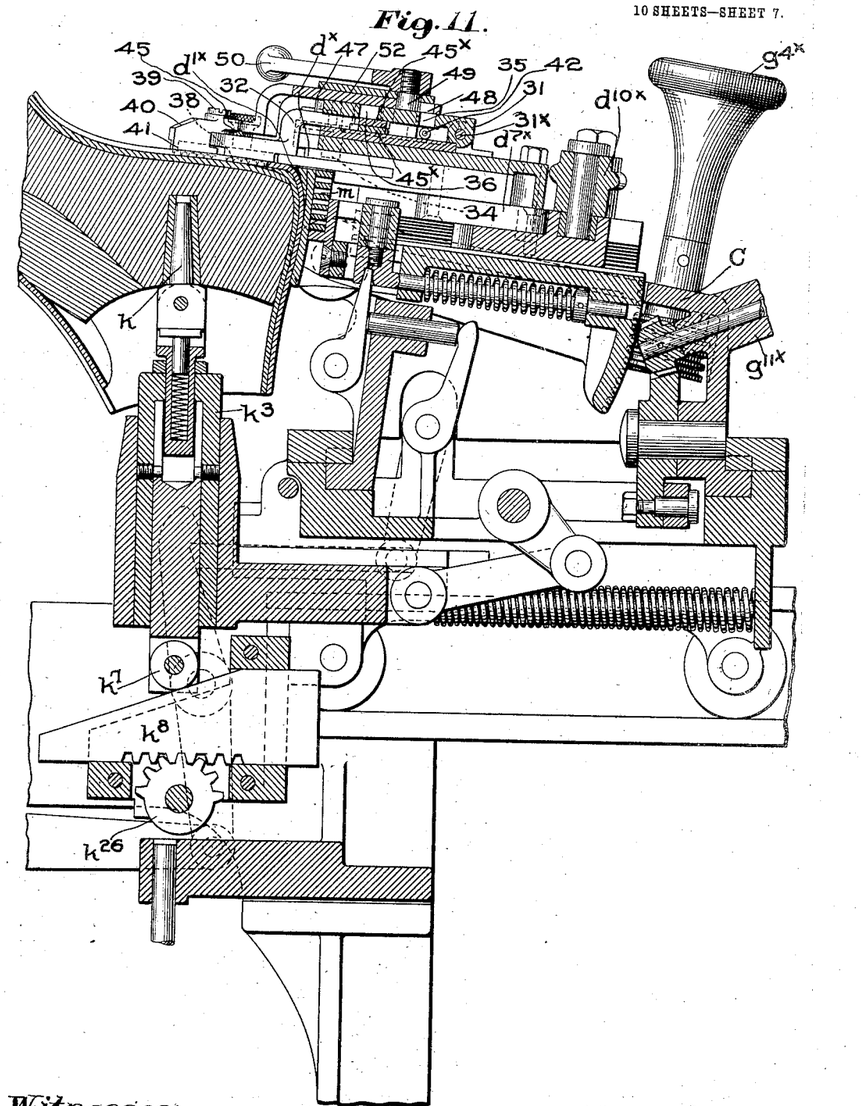
Fig. 11, a vertical, longitudinal section of the heel lasting head showing the heel portion of a last with its upper in position.
Figure 12:
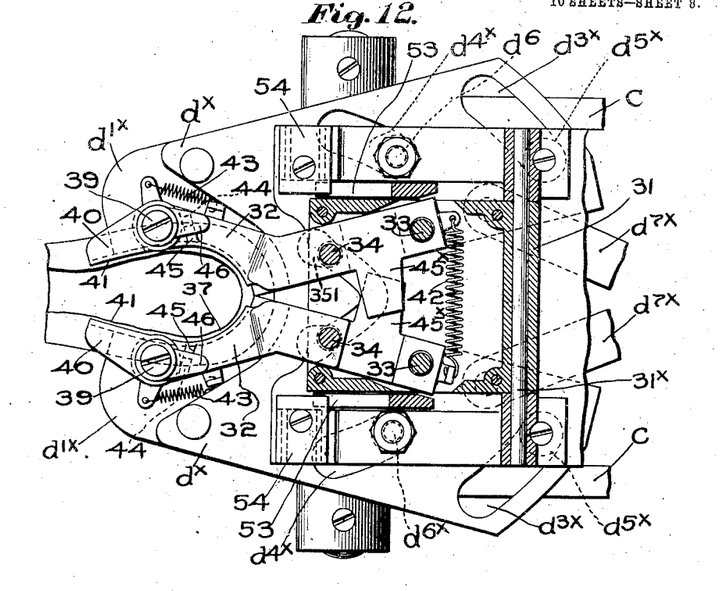
Fig. 12, a plan view partly in section, of the heel wipers and holding dogs with cover plate and other parts above the same removed.
Figure 13:
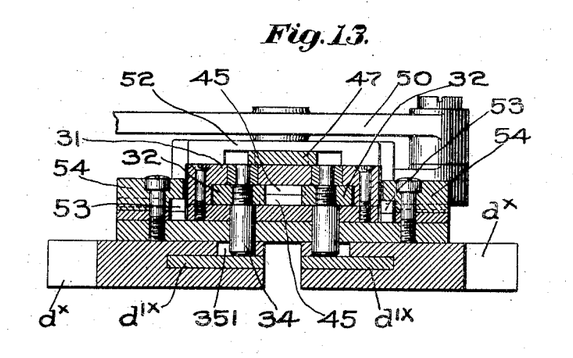
Fig. 13 is a transverse section of the upper portion of the heel lasting head on the dotted line 13—13, Fig. 14.

Referring to Figs. 10 to 12, the lasters 32 are shown as provided at their inner edges with depending lips 37 provided like the toe lasters with depending points 38 (shown in dotted lines Fig. 11). At their active ends said lasters 32 are provided with studs 39, upon which are loosely fulcrumed the seat lasters 40 also provided with depending lips 41, provided with like points to enter the material. The heel lasters 32 are held normally open at their active ends by a spring 42 connecting their inner or rear ends (see Fig. 12), said spring acting to cause the lips 37 of said lasters to be held back normally in contact with the active edges of the wipers behind them. Similarly, the seat lasters 40 are held in their opened positions with their lips 41 against the active edges of said wipers by springs 43, connecting said seat lasters with lugs on the lasters 32. The spring actuated movements of the seat lasters 40 are limited by stops 44 thereon which coöperate with corresponding stops 45 on the lasters 32. To maintain the level or parallelism of the heel lasters 32, their tail portions are respectively provided with overlapping ears $45^x$, which have a free sliding movement one upon the other.

The seat lasters 40 are provided with tail pieces 46, adapted to be engaged by the inclined ends of a forked actuator 47 which overlies the heel lasters 32 (see Fig. 11) and is shaped to rise above and to permit its stem to extend rearwardly over the tails of said heel lasters. At its rear end the stem of said actuator 47 is slotted at 48 to receive the depending stud 49 on the heel laster handle 50, fulcrumed at 51 (see Fig. 10) on the heel head.

Surmounting the entire heel mechanism, including the stem of said actuator is a yoke 52 similar to the yoke at the toe head but larger in area and which, at the sides of the head, is provided with downturned leg portions having forwardly extended bevel ended fingers 53, adapted to slide forward beneath the conversely bevel edged ears 54 on the heel head, so that as said yoke is advanced said fingers 53 will cause it to be depressed together with the heel lasters beneath it to jam said lasters into engagement with the materials in a manner similar to the toe lasters described.

The last having been jacked, and the heel clamp, typified at $m$ (Fig. 11), having been closed about and upon the heel, the operative turns the supplemental carrier 31 down into position, directing the heel lasters 32 and 40 with his fingers, so as to permit the studs or pins 34 to enter the slots or openings 351 provided therefor (see Fig. 13) in the wiper carriers, this leaving the lips on the heel lasters and seat lasters standing in front of the wipers but with their toothed or pointed edges above the under or active faces of the said wipers. The operative now, by means of the usual heel wiper lever $d^{10x}$, advances the heel wipers to break down the materials at the heel of the last. If the work justifies or requires the operative now operates the laster handle 50 to depress the heel and seat lasters at the beginning of the heel lasting operation so as to cause them to have effective engagement with the materials at the heel, and since they are now held down in engagement with the materials, farther advancement or closing of the wipers must carry the lasters before them to cause the materials to be drawn positively about and over the heel end of the last, thus accomplishing what a mere frictional engagement as between the wipers and said materials could not. The operative may now return the wiper handle $d^{10x}$ without danger of correspondingly withdrawing the infolded materials, and, having brought them near to but not over the edge of the insole, sufficiently to leave within the wipers enough material to provide for proper fastening thereof, he returns the laster handle 50 to its normal position, freeing the heel and seat lasters so that they may be turned upward into their normal positions (Fig. 1) to permit him to tack or otherwise fasten the infolded edges of the materials.

Figure 14:
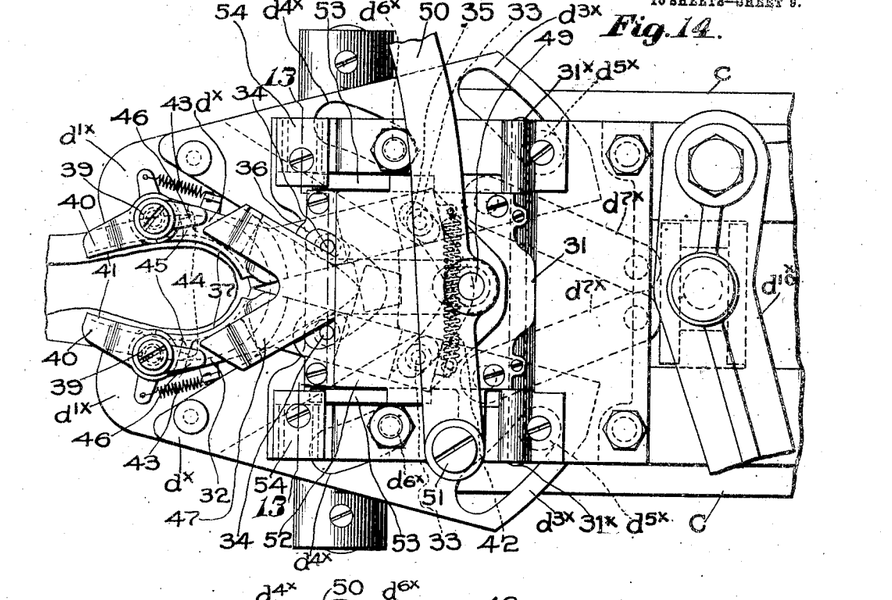
Figs. 14, 15, 16 and 17 are diagrammatic views illustrating successive steps in the mode of operation of the parts comprising the heel lasting head.
Figure 15:
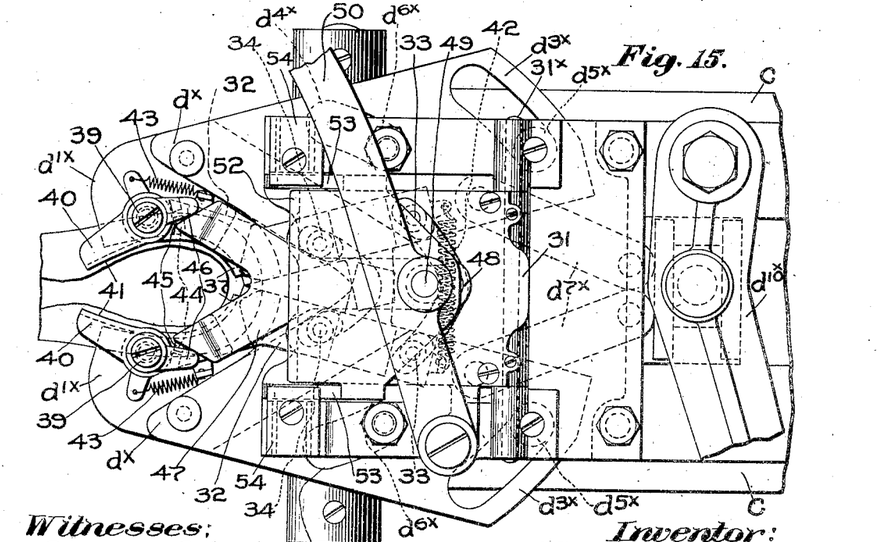
Figure 16:
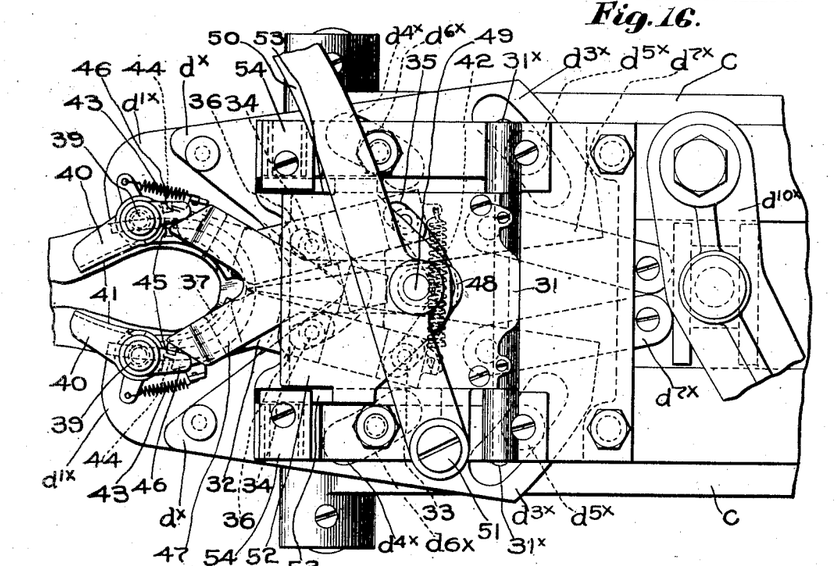
Figure 17:
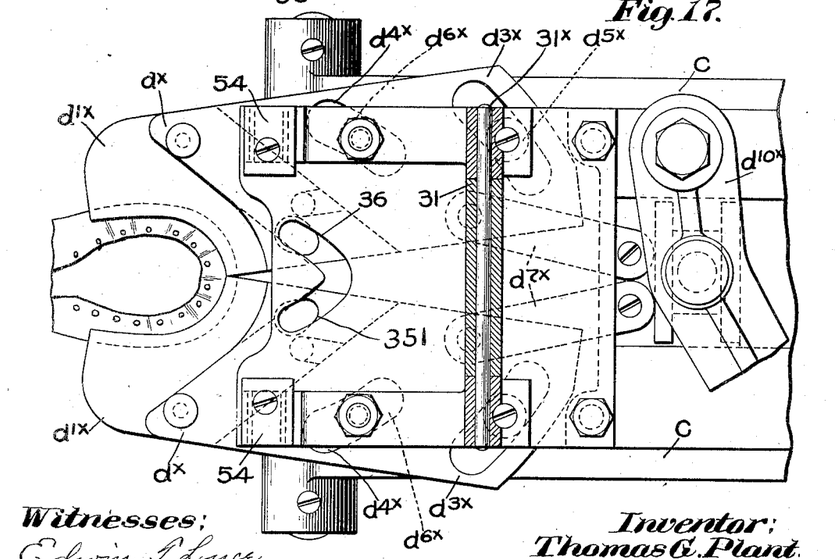

With any of the wiper or bed types of machines heretofore known to me, it has been difficult if not impossible to obtain a sufficient and proper inward closing movement at the outer ends of the heel wipers, properly to last said materials over the shank at the breast end of the heel seat. The draft at this point should be not only inward but rearward toward the center of the heel seat, and it is impossible to obtain such a movement by any of the usual wiper mechanisms. My invention provides means for obviating this difficulty for, whether the heel lasters be brought into positive engagement with the materials at the beginning of the lasting operation and so as positively to draw said materials inward over the last, or, whether they be brought down merely to clamp and hold said materials after the latter have been brought in by the wipers, the handle 50 may be further advanced beyond what was necessary merely to depress the heel and seat lasters and without further depressing the lasters, to cause its stud 49 (Fig. 11) to meet the front end of the slot 48 in the actuator 47 and cause said actuator to be advanced from its position Fig. 14 to its position Fig. 15. This advance of said actuator through contact of its inclined leading arms with the tails of the seat lasters 40 operates to turn said seat lasters about their fulcra into their positions Fig. 15, to cause an inward and rearward draft toward the center of the heel seat to be exerted upon the materials at the rear end of the shank and at the front of the heel seat, to draw the materials thereat closely in to the last and in a direction and manner heretofore impossible in lasting machines of this type. Of course said seat lasters having been thus turned inward by final movement of the heel laster handle 50, may be retained in such innermost most position by holding said handle 50 during the withdrawal of the wipers preparatory to tacking, so that when the said heel and seat lasters are released and raised from the work the materials will be found in all respects in proper position and condition for fastening. Thus for the first time so far as known to me, I am able properly to last the heel seat. Similarly also at the toe, the toe lasters described furnish means for obtaining an inward draft of the materials at the sides of the toe portion of the last and in the vicinity of the tip line which is absolutely necessary for proper toe lasting, yet which it has been heretofore impossible to obtain with wipers such as heretofore used.

It is not customary to shift the heel wipers for rights and lefts, consequently it is not necessary to illustrate means for shifting the heel lasters and shank lasters. At the toe, however, it is customary to shift the wipers according as the shoes to be lasted are rights or lefts, and, while the construction and mounting of the toe lasters 13 are such as to permit of considerable variation in shape of the wipers employed in connection therewith, nevertheless, if the swing of the shoe is extreme it will be found desirable after a certain range has been reached to change the toe lasters as well as the wipers. To permit of this change the fulcrum pins 14 (see Figs. 4 and 5) upon which the toe lasters 13 are mounted are provided immediately above the supplemental carrier 12 with segmental flanges 55, adapted for engagement with the hooked ears 56 on the said carrier. When the said pins are turned to carry the said flanges 55 under said ears 56, said pins will be locked against withdrawal but by giving them a partial turn their flanges may be freed from the ears and the pins readily withdrawn to permit of the substitution of properly shaped toe lasters, in connection with which they are to be used.

My invention obviously, is not limited to the particular embodiment thereof herein shown but may be varied within the scope of the invention gathered from the foregoing description and the claims.

Having described my invention, and without limiting myself to immaterial details, what I desire to claim and secure by Letters Patent is:

1. A lasting machine comprising, in combination, a last support, end wipers for laying the margin of the material to be lasted over the insole, a device positively to engage the material in front of the wipers, and means to move said wipers and device after such engagement in a single plane substantially parallel with the bottom of the last to stretch and conform the materials to the last.

2. A lasting machine comprising, in combination, a last support, end wipers, positive work engaging lasting devices constructed and arranged to operate in front of the wipers on one side only of the materials to be lasted and within the area bounded by the edge of the last, and means to close and open said wipers and devices relatively to the last by movement in a plane substantially parallel with the bottom thereof.

3. A lasting machine comprising, in combination, a last support, a wiper for engaging the material at the end of the last and means to operate it, and a device acting in front of the wiper positively to engage the outer surface only of the material engaged by the wipers, and means to move the wiper and said device relatively to the last and in a plane substantially parallel with the bottom thereof.

4. A lasting machine comprising, in combination, a last support, wiping means, devices to engage the outer surface only of the material in front of the wiping means, and means for moving said devices in a plane substantially parallel with the bottom of the last, said devices being constructed and arranged to hold said material during retraction of the wiping means.

5. A lasting machine comprising in combination a last support, wiping means, and positive work engaging devices and means to operate the same simultaneously with and immediately in advance of the acting faces of said wiping means.

6. A lasting machine comprising, in combination, a last support, wiping means, and combined positive work drawing and work holding means coöperating with said wiping means, constructed and arranged to engage the outer surface only of the material to be lasted and operable in or substantially parallel to the plane of the bottom of the last.

7. A lasting machine comprising in combination a last support, end wipers, means to move said wipers to break down the material to be lasted, and work holding means normally in inoperative position with means for bringing the same into operative engagement with the materials broken down by the wipers and thereafter to advance the same substantially parallel with the bottom of the last.

8. A lasting machine comprising, in combination, a last support, wiping means, positive work engaging means coöperating with the wiping means, normally in inoperative position and wholly on one side of the material to be lasted, and means to bring the same into operative position and thereafter move the same positively substantially parallel with the bottom of the last to draw the work to position and hold said work for withdrawal of the wiping means.

9. A lasting machine comprising in combination a last support, end wiping means, positive work engaging devices for operating at each side of the shoe and a carrier therefor mounted to swing said devices into and out of operative positions, and means to close said devices toward the center of the shoe when in this operative position.

10. A lasting machine comprising in combination a last support, end wipers, and positive work engaging means arranged to be operated by said wipers.

11. A lasting machine comprising in combination a last support, end wipers, and positive work engaging means having simultaneous closing movement with said wipers.

12. A lasting machine comprising in combination a last support, end wipers, positive work engaging means, and means to impart thereto and to said wipers both simultaneous and independent closing movements.

13. A lasting machine comprising in combination a last support, end wipers, positive work engaging means normally in inoperative position and adapted to be brought into operative relationship to said wipers, movable means to arrest said positive work engaging devices when placed in juxtaposition to said wipers, and means thereafter to operate said work engaging devices.

14. A lasting machine comprising in combination a last support, end wipers, positive work engaging means normally in inoperative position and adapted to be brought into operative relationship to said wipers, movable means to arrest said positive work engaging devices when placed in juxtaposition to said wipers, provisions for predeterminately positioning said devices with relation to said wipers and means thereafter to operate the same.

15. A lasting machine comprising in combination a last support, end wipers and means to move the same, and additional positive work engaging devices and means to open and close the same about vertical axes.

16. A lasting machine comprising in combination a last support, end wipers, supplementary lasting devices over the insole, and means to impart vertical movement thereto for engagement with the outer surface only of the material to be lasted.

17. A lasting machine comprising in combination a last support, end wipers, end lasters arranged on opposite sides of the last over the insole and means to impart vertical also closing and opening movements thereto relative to and independent of said wipers.

18. A lasting machine comprising in combination a last support, end wipers and means to operate them, end lasters arranged on opposite sides of the last and means to close and open the same toward and from the center of the last independently of said wipers, said end lasters presenting respectively a plurality of work engaging projections.

19. A lasting machine comprising in combination a last support, end wipers operating about the tip of a last, and independently operable end lasters over the insole operating at the sides of the last near the end thereof and in a plane substantially parallel to the last bottom.

20. A lasting machine comprising in combination a work support, a pair of end wipers, a pair of positively engaging end lasters, all movable in planes substantially parallel with the bottom of the last at the end of the latter, and means to operate said wipers and lasters.

21. A lasting machine comprising in combination a work support, a pair of end wipers, a pair of end lasters, means to operate said wipers and lasters, and means to depress said lasters for engagement with the outer surface of the infolded work independently of said wipers.

22. A lasting machine comprising in combination a last support, end wipers and means to close the same, end lasters arranged on opposite sides of the last and means to close the same toward the center of the last, and means to depress said end lasters independently of the closing thereof.

23. A lasting machine comprising in combination a last support, end wipers and an operating handle therefor extended to one side of the machine, end lasters over the insole and an operating handle therefor extended to the opposite side of the machine.

24. A lasting machine comprising in combination a last support, end wipers and an operating handle therefor extended to one side of the machine, end lasters over the insole and an operating handle therefor extending to the opposite side of the machine, said handles being operable in unison and independently.

25. A lasting machine comprising in combination a last support, end lasting means comprising members adapted to be closed and opened relative to the last, and other members moving in the same plane therewith and adapted to have closing and opening movement relative to the last simultaneously with said end lasting means.

26. A lasting machine comprising in combination a last support, end lasting means comprising members constructed to close and open relative to a last and other members mounted thereon and movable therewith, and means to move said other members additionally to their movement by said first named members.

27. A lasting machine comprising in combination a last support, end lasting means comprising a pair of members mounted for closing and opening movement about the end of a last, and additional members carried thereby at a point removed from the end of the last and having closing and opening movements in a direction toward a point within the circle of the end of the last.

28. A lasting machine comprising in combination heel wipers, supplementary heel lasting devices operating within said wipers, said devices comprising heel lasters proper and connected seat members with means for operating said heel lasters proper and seat members independently.

29. A lasting machine comprising in combination heel wipers, supplementary heel lasting devices operating within said wipers, said devices comprising heel lasters proper and connected seat members with means for operating said heel lasters proper and seat members both simultaneously and independently.

30. A lasting machine including in combination positive engaging end lasters comprising a plurality of members adapted to be advanced and closed relative to the last end and other members mounted on said first named members, and means to close them relative to said first named members.

31. A lasting machine comprising in combination end wipers and means to operate them, end lasters operable within said wipers and means to operate the same, and seat lasters connected with and to be moved by, also independently of said end lasters.

32. A lasting machine comprising in combination positively engaging end lasters, the latter including members with means to advance and close the same over the last, other members connected with said first named members and means to move the same relative to said first named members, and means to depress all said members toward the work.

33. A lasting machine containing in combination a wiper carrier wipers and means to operate the same, the positively engaging toe lasters 13, and the supplemental carrier therefor sustained on said wiper carrier.

34. A lasting machine containing in combination toe wipers and means to operate them, the positively engaging lasters 13 having lips 15, provided each with a series of teeth and operating means therefor.

35. A lasting machine containing, in combination, toe wipers and means to operate them, the lasters 13, the movable yoke 28 constructed to lock the lasters in working position by its movement, and operating means for the latter.

36. A lasting machine containing in combination toe wipers having channels 18, operating means therefor, the lasters 13, a supplemental carrier therefor, and the pins 16, carried by the lasters and adapted to enter the channels 18.

37. A lasting machine containing in combination heel wipers and operating means therefor, heel lasters 32, a laster carrier having the operating slots 35, 36, and studs 33, 34, on the lasters and entering said slots.

38. A lasting machine containing in combination heel wipers and operating means therefor, heel lasters 32, seat lasters 40 carried by the heel lasters, and operating means for the seat lasters.

39. A lasting machine containing in combination the heel wipers and operating means therefor, the heel lasters 32 having lips 37, the yoke 52, constructed to lock said lasters in operative position and seat lasters 40 carried by the heel lasters and operating means for the seat lasters.

40. A lasting machine containing in combination heel wipers and operating means therefor, heel lasters 32, the yoke 52 constructed to lock said lasters in operative position, the seat lasters 40 carried by the heel lasters and the actuator 47 for the seat lasters.

41. A lasting machine comprising, in combination, means operating in substantially the plane of the last bottom for placing an upper in overworked position on a last, and means constituting an element of the lasting machine to maintain said upper in position during withdrawal of the overworking means before the upper is secured to the last.

42. A lasting machine comprising, in combination, means for placing an upper in overworked position on a last, and means constituting an element of the lasting machine positively to engage the upper to maintain the same in position during withdrawal of the overworking means before the upper is secured to the last.

43. A lasting machine comprising, in combination, means for moving the last and work relatively to draw the work to the last at the sides of the last end, a device adjacent the last bottom positively to engage the work so drawn to the last and movable toward the center of the last, and actuating means for said parts.

44. A lasting machine comprising, in combination, lifting means for engaging and drawing the work to the last at the sides of the last end, a device over the last bottom positively to engage the work so drawn to the last, and means to move said device relatively to the last to overlie the work upon the last bottom.

45. A lasting machine comprising, in combination, means to work the upper over the sides of the last end, positive work engaging lasting devices arranged over the last end and at each side thereof, and means to open and close the same substantially in the plane of the last bottom.

46. A lasting machine comprising, in combination, toe wipers, holding lasters adjacent said wipers and constructed positively to engage the work, and means to actuate said lasters in a plane substantially parallel to the last bottom independently of said wipers and stretch the upper toward the center of the last.

47. A lasting machine comprising, in combination, folding toe wipers, folding toe lasters, means to open and close said wipers and independent means to open and close said lasters.

48. A lasting machine comprising, in combination, toe wipers, and an auxiliary toe lasting device yieldingly sustained upon said wipers.

49. A lasting machine comprising, in combination, toe wipers, an auxiliary toe lasting device normally removed from contact with said wipers, a carrier on which said device is mounted, a yielding connection between said device and the carrier and means whereby said device may be placed in operative relationship to said wipers.

50. A lasting machine comprising, in combination, toe wipers, an auxiliary lasting device for each wiper normally removed from contact with said wipers and means to bring the same into contact with said wipers, said wipers being constructed to insure predeterminately each device being in correct operative relationship therewith.

51. A lasting machine comprising, in combination, toe wipers having grooves adjacent their active edges, an auxiliary lasting device for each wiper, and a pin carried by each device to engage its respective groove and thereby position said devices with respect to said wipers.

52. A lasting machine comprising, in combination, toe wipers, a carrier adjacent said wipers, and auxiliary work engaging means removably sustained by said carrier.

53. A lasting machine comprising, in combination, a toe lasting head, a supplemental carrier sustained thereby, and positive engaging toe lasting devices removably mounted in said carrier.

54. A lasting machine comprising, in combination, a carrier, positive engaging toe lasting devices fulcrumed vertically therein, and means for moving said devices about their fulcrums in a direction to draw the work over the insole and toward the center of the last.

55. A lasting machine comprising, in combination, a carrier, positive engaging toe lasting devices fulcrumed therein, an actuator therefor, and means to maintain said devices in contact with the actuator.

56. A lasting machine comprising, in combination, a carrier, positive engaging lasting devices fulcrumed therein, a wedge-shaped member between the shanks of said devices, and means for moving said member.

In testimony whereof, I have signed my name to this specification, in the presence of two subscribing witnesses.

THOMAS G. PLANT.

Witnesses:
 FREDERICK L. EMERY,
 ROBERT H. KAMMLER.